Figure 1:
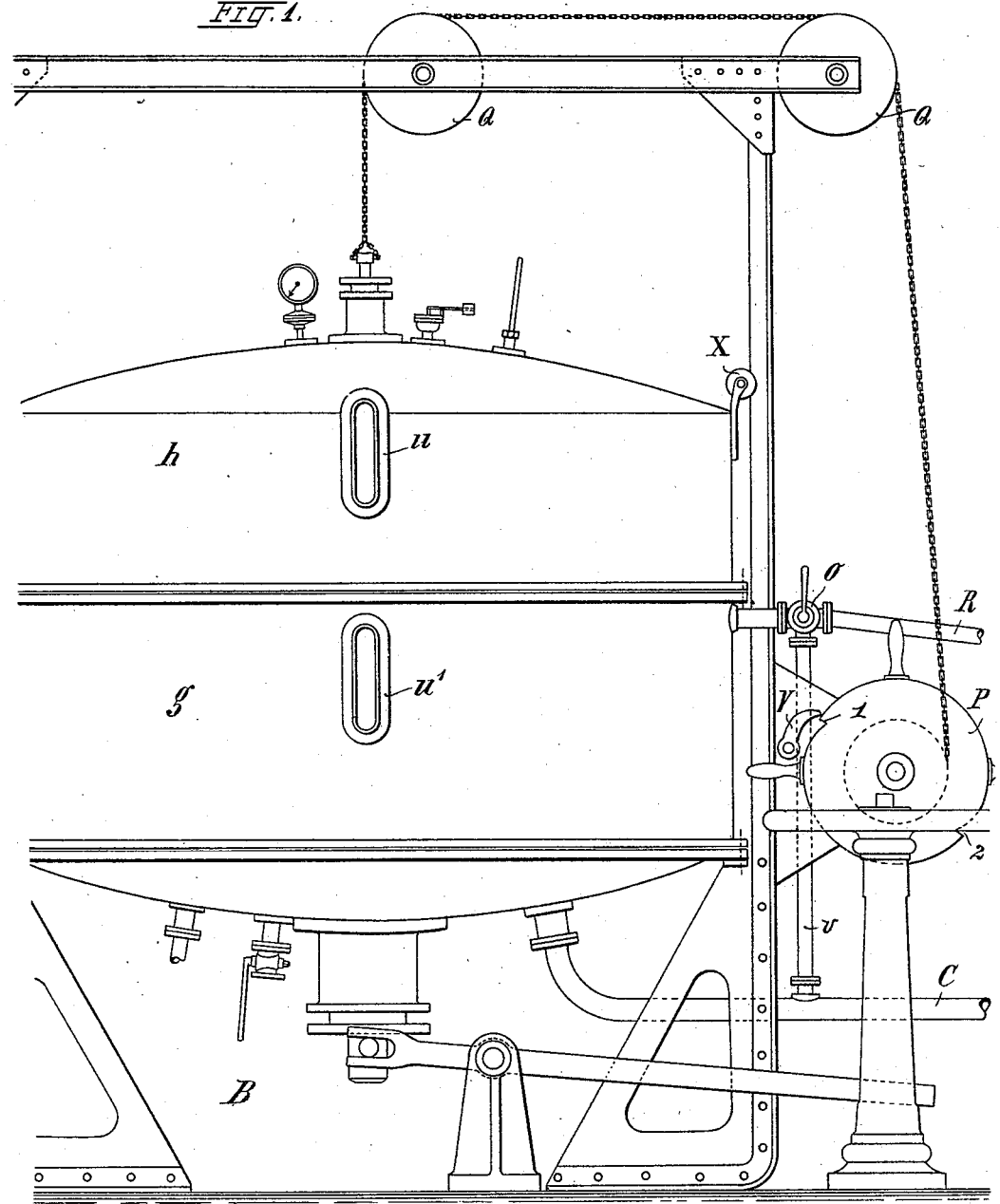

(No Model.)  7 Sheets—Sheet 1.
J. F. H. GRONWALD.
STERILIZING APPARATUS.

No. 455,923.  Patented July 14, 1891.

(No Model.) 7 Sheets—Sheet 3.
J. F. H. GRONWALD.
STERILIZING APPARATUS.

No. 455,923. Patented July 14, 1891.

Witnesses:
H de Vos.
C. L. Richards

Inventor:
Johann F. H. Gronwald
By Richards & Co.
Attorneys.

(No Model.) 7 Sheets—Sheet 4.
J. F. H. GRONWALD.
STERILIZING APPARATUS.
No. 455,923. Patented July 14, 1891.
FIG. 5.
FIG. 6.
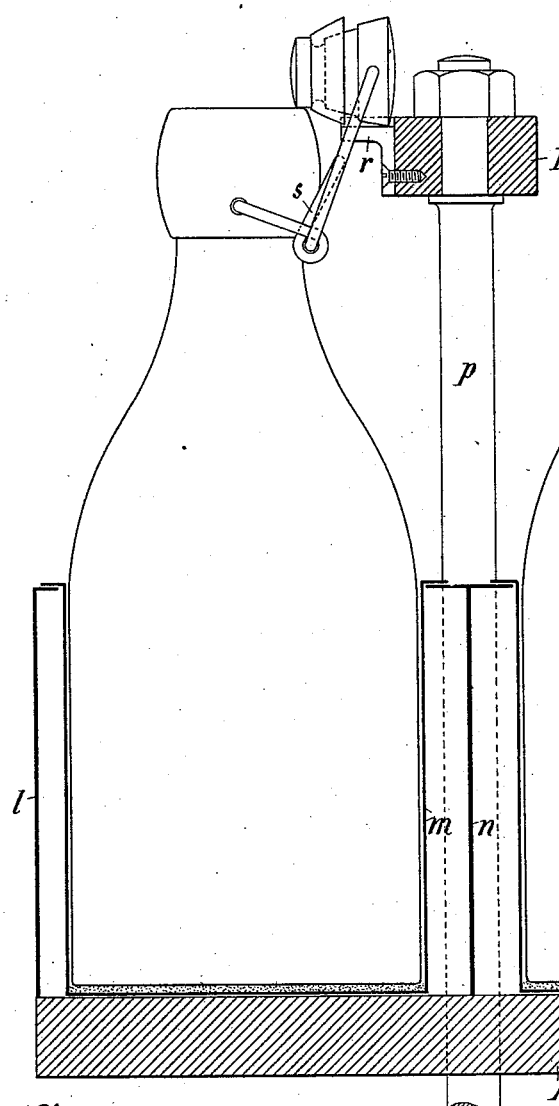
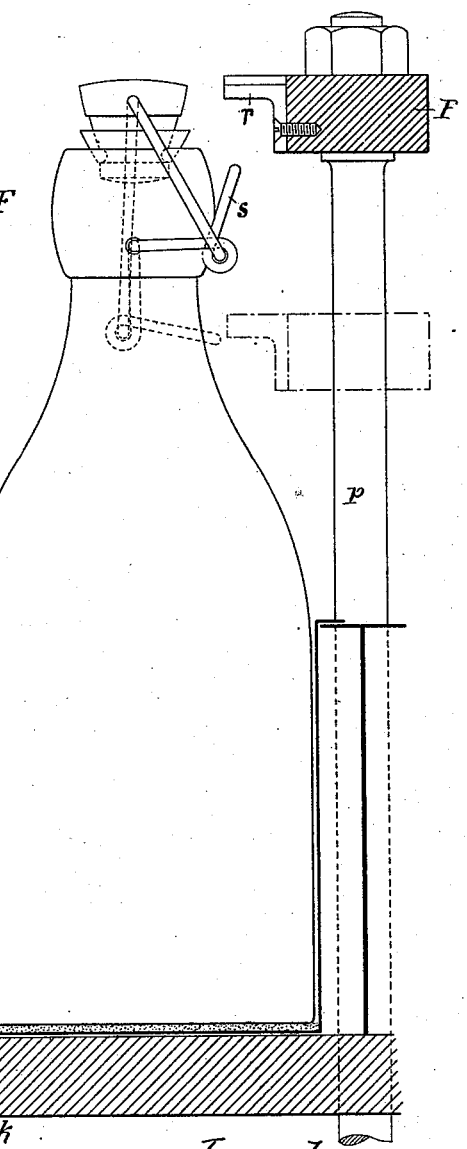
Witnesses:
Ade Vos.
E. L. Richards
Inventor:
Johann Franz Hugo Gronwald
By Richards
Attorneys.

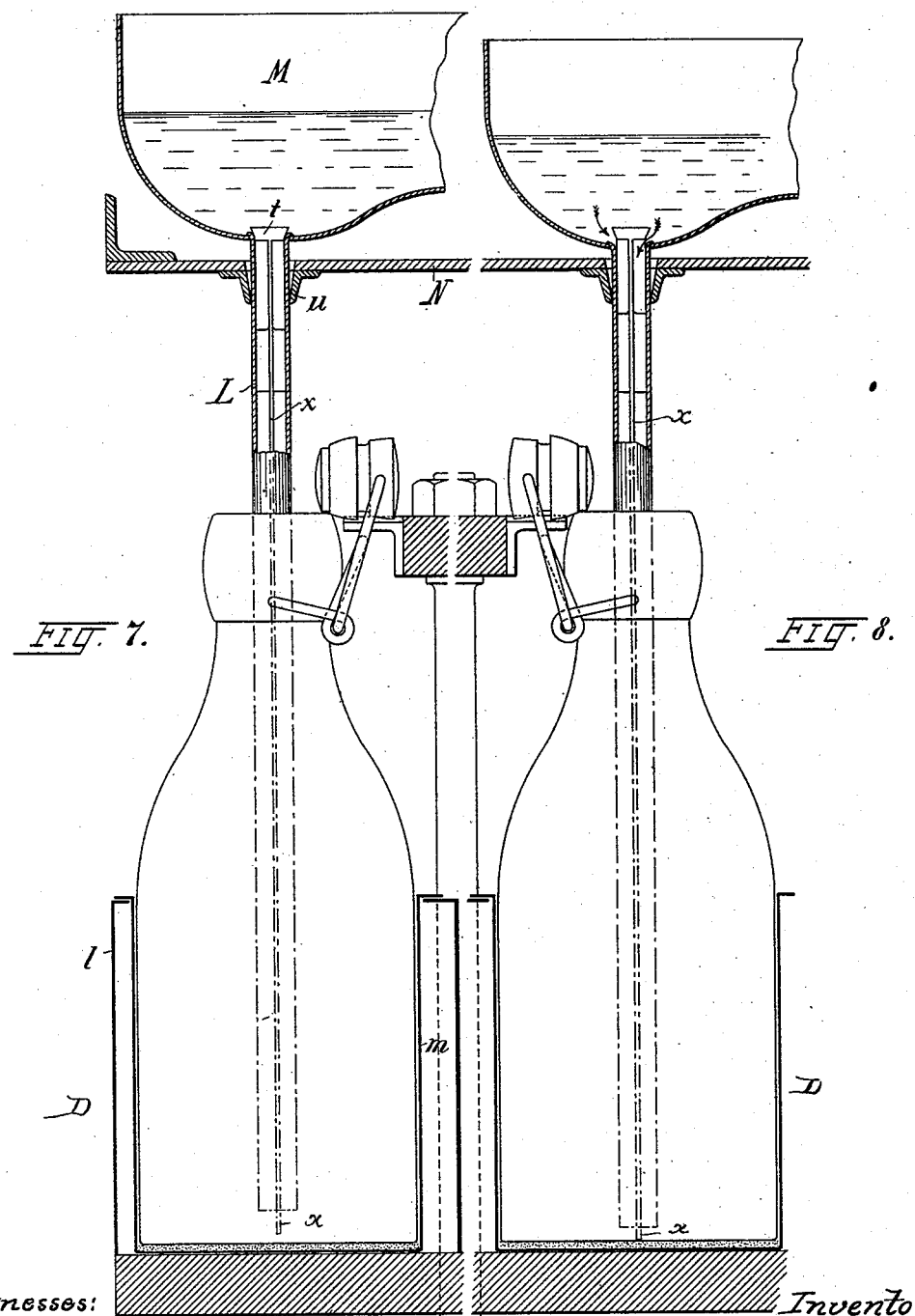

(No Model.) 7 Sheets—Sheet 6.
J. F. H. GRONWALD.
STERILIZING APPARATUS.

No. 455,923. Patented July 14, 1891.

Witnesses:
Inventor: Johann F. H. Gronwald
By Richards
Attorneys.

(No Model.) 7 Sheets—Sheet 7.

J. F. H. GRONWALD.
STERILIZING APPARATUS.

No. 455,923. Patented July 14, 1891.

Witnesses:
H de Vos.
C. L. Richards.

Inventor:
Johann Franz Hugo Gronwald,
By Richards & Co.
Attorneys.

UNITED STATES PATENT OFFICE.

JOHANN FRANZ HUGO GRONWALD, OF BERLIN, GERMANY, ASSIGNOR OF TWO-FIFTHS TO EMIL HEINRICH CONRAD OEHLMANN, OF SAME PLACE.

STERILIZING APPARATUS.

SPECIFICATION forming part of Letters Patent No. 455,923, dated July 14, 1891.

Application filed May 28, 1889. Serial No. 312,371. (No model.)

*To all whom it may concern:*

Be it known that I, JOHANN FRANZ HUGO GRONWALD, a subject of the King of Prussia, residing in Berlin, Germany, have invented certain new and useful Improvements in Apparatus for Preparing Milk so as to Enable the Same to be Preserved Indefinitely, of which the following is a full, clear, and exact description.

The object of the present invention is to prepare milk in such a manner as to enable it to be preserved in its natural normal condition for indefinite periods.

The said invention is valuable both for economic and hygienic reasons.

It is well known that when milk is prepared for consumption by boiling and by reason of the accidents frequently occurring when this is done (such as boiling over and burning) and by deterioration of the milk when it is to keep for some time, particularly in warm weather, waste of time and money is caused, which in the aggregate represents a not inconsiderable loss. To prevent such losses must necessarily be beneficial to the general public. By this invention the losses above referred to are avoided. The milk prepared as hereinafter stated is ready for consumption and requires no further boiling, it will not "turn" even by continued application of heat above summer temperature, (30° centigrade,) and the advantage of using such milk, the price of which will be about equal to that of the milk usually sold, is obvious.

A further important consideration is the following: It is a well-established fact that milk is not unfrequently a vehicle for disease-germs, which are capable of transmission from the organism of animals to that of mankind. Tuberculosis and scrofula are these. It is also acknowledged by medical men that the diarrhea so frequently occurring in an epidemic form in summer, and which decimates infants, is caused by infection through milk. Thus damage to health and loss of human life consequent upon the consumption of diseased milk are by no means slight and have caused competent authorities to utter urgent demands for germ-free milk. Milk treated according to this invention fulfills this requirement, being free from all infectious matters, all micro-organisms contained in the milk, whether ferments or disease-germs, being killed in the treatment. The hygienic importance of the said invention must therefore also be acknowledged. In other respects the quality of the milk is not affected, the separation of the caseine and fatty matters taking place by the same manipulations as with fresh milk. The taste of the milk prepared according to this invention is also better than that of ordinary boiled milk, the latter always having a peculiar taste. In accordance with this invention good milk is first examined as to the amount of alkaline matter it contains. It is required that the milk should be neutral. If there is acidity, this is corrected by the addition of bicarbonate of potassium, an alkaline salt usually contained in the milk. The milk is then exposed to circulating aqueous vapor of 100° centigrade temperature during a definite time and is then under pressure filled into suitable vessels contained in a hermetically-closed receiver and likewise sterilized by aqueous vapor of 100° centigrade, and the vessels are then hermetically closed.

The principal features of the new process are, first, neutralization of the milk; second, the period during which it is exposed to aqueous vapor of 100° temperature; third, the separate sterilization of the receptacles for receiving the milk and of the closing devices therefor.

The first operation is neutralization of the milk. Owing to unsuitable feeding of the cattle from which the milk is derived, the latter usually shows acid reaction and contains free lactic acid. This has to be remedied, as the acid in the milk would cause, even in milk free from germs, separation of the proteines and consequent coagulation of the milk. Next, the time during which the flowing aqueous vapors (at 100°) are permitted to act upon the milk has also carefully to be regulated, because, even if the conditions as to neutralization are fulfilled and the milk is free from germs, yet heating beyond the right time will also cause coagulation of the proteine. Thirdly, separate sterilization is required of the receptacles for the milk and of the devices for closing the same by circulating aqueous vapors of 100° centigrade temperature in a closed vessel hermetically closed against the atmosphere, as it is by this means alone that freedom from germs of the receptacles, and especially of the closing devices, can be insured.

The apparatus for carrying this process into practice are represented in the accompanying drawings, in which—

Figure 2:
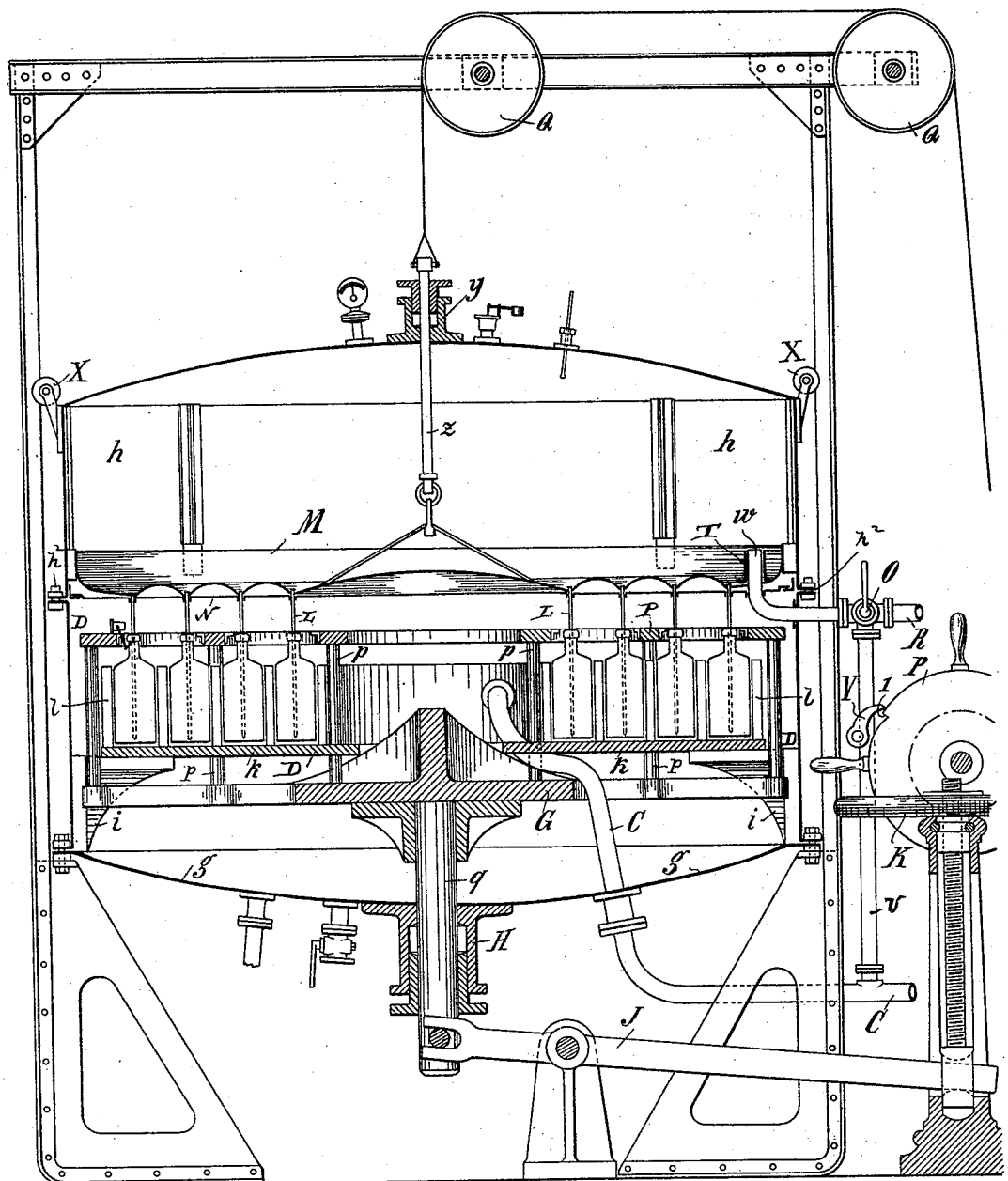
Figure 3:
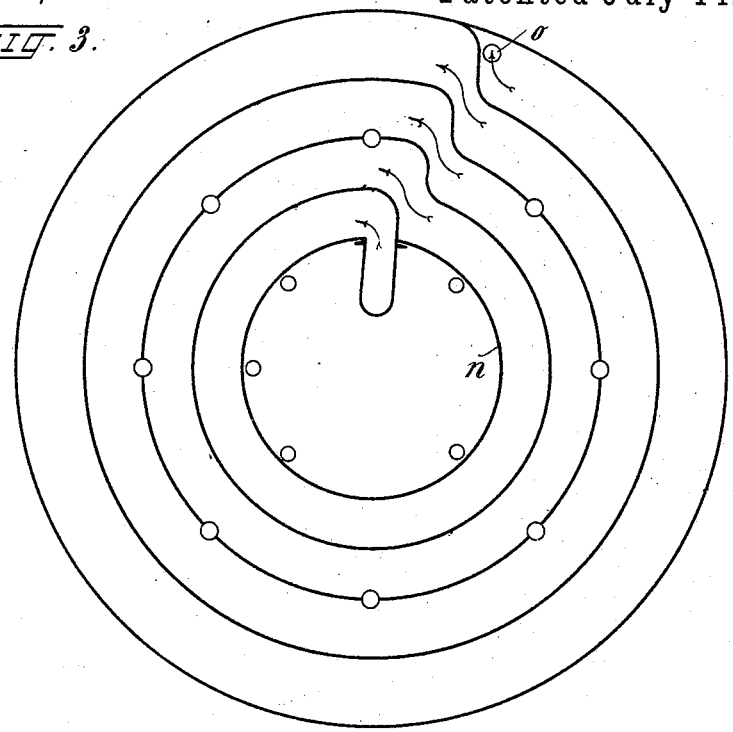
Figure 9:
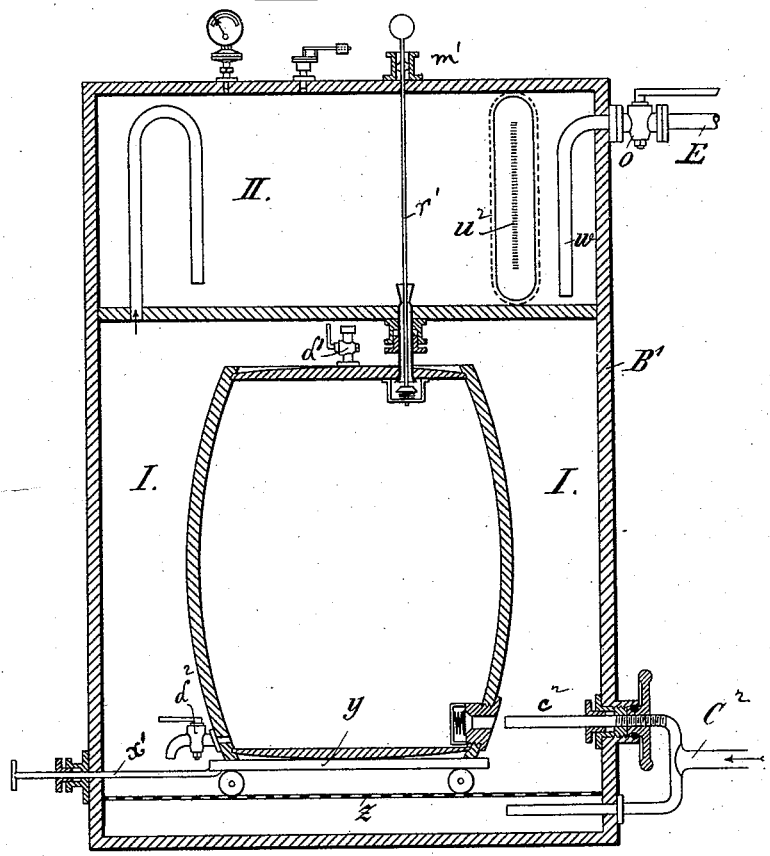
Figure 10:
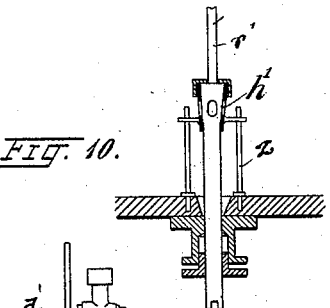
Figure 11:
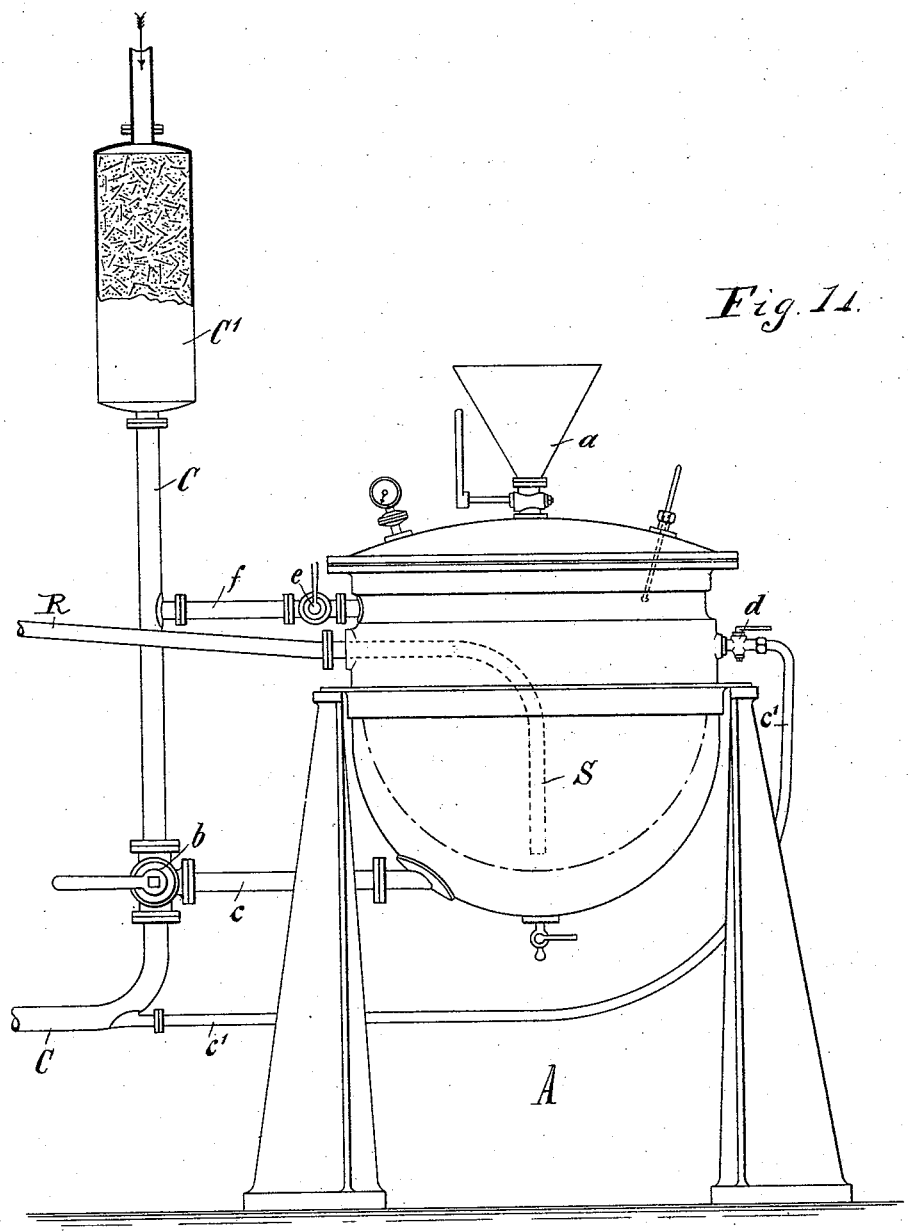

Figure 1 is an elevation of the apparatus for bottling the milk. Fig. 2 shows the filling and closing apparatus in section. Figs. 3 to 8 show various details of the same; and Figs. 9 and 10 illustrate an apparatus for filling large vessels, such as casks or barrels. Fig. 11 is an elevation of the apparatus for preparing the milk for bottling or for being otherwise put up.

The entire apparatus for preparing the milk consists of the pan or boiler A and the filling and closing apparatus B. The pan or boiler A is of known construction and has a steam-jacket, and the closely-fitting lid is provided with an inlet-funnel, pressure-gage, and thermometer. When a given quantity of milk has been measured off (say, for instance, one hundred liters) and poured by the funnel $a$ into the pan A, the two-way cock $b$ of the steam-pipe C is so set that steam passes through pipe $c$ into the steam-space of the pan A (the jacket) and heats the milk to 100°. When this is done, the steam-outlet $d$ on the upper part of the jacket is opened and the steam-supply so adjusted that the temperature of 100° is not exceeded to any considerable extent. The steam escaping from the steam-outlet passes by pipe $c'$ into the lower part of pipe C and thence to the filling apparatus (which thus far is not supplied with direct steam) and heats the same. The steam for heating the milk is purified before use, being to this end passed through a purifying-vessel C', filled with charcoal or other suitable purifying agents. Simultaneously with the operation last hereinabove mentioned the stop-cock $e$ is opened, and the branch pipe $f$ on pipe C admits fresh steam into the pan A and upon the milk, so that the milk is surrounded by boiling steam. The boiling will therefore not affect its composition. The milk is maintained at the temperature of 100° for as long a time as appears requisite to enable it to be kept. During these operations the filling and closing apparatus is prepared for further manipulation of the milk.

Figure 4:
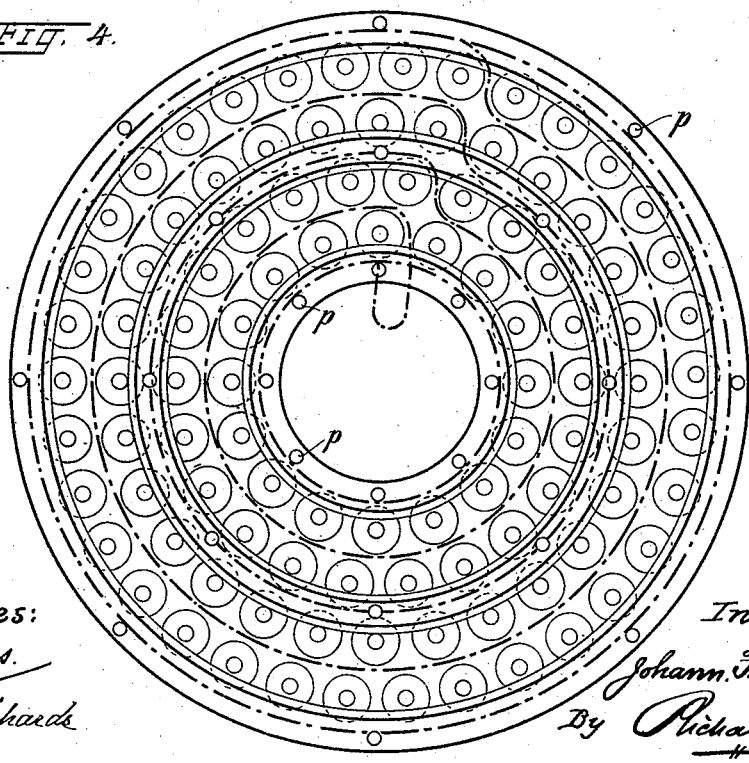

The filling and closing apparatus consists of a bottom portion $g$ and a lid $h$, so secured thereto as to be readily removable but yet steam-tight. In the bottom portion $g$ is arranged the plate or table D, supported on brackets $i$ and serving for the reception of the receptacles for the milk—say bottles. The table D, Figs. 2 and 4, consists of a solid plate $k$ and an upper part $l$, capable of being heated. (See Figs. 2, 5, and 8.) The upper part of the tray is fitted with as many shells, boxes, or frames $m$, Fig. 7, (made, say, of copper,) as there are bottles to be filled at one operation. If, for instance, the apparatus is to work up one hundred liters of milk at each operation and fill it into liter-bottles, there will be one hundred boxes or shells $m$. The pipe C supplies steam for the table D, and the steam, guided by a spiral partition $n$, Figs. 3 and 4, passes around all the shells or boxes $m$ and ultimately issues through the aperture $o$, Fig. 3, into the body of the apparatus B. In each box or shell there is a bottle fitted, preferably, with a stoppering device of the kind shown in the drawings, (see Figs. 5, 6, 7, and 8,) and thus all the bottles are evenly heated to 100° centigrade. The stoppers of all the bottles are open and rest on stout rings P. (See Fig. 5.) Four such rings are provided in an apparatus of the dimensions above stated, and, as shown in Fig. 4, they are so arranged that the stoppers of all the bottles can readily be rested thereon. The rings P are connected with the star-shaped plate G by rods $p$, which pass through stays, making tight joints with the interior of table D, and into holes or recesses in the plate G. The plate G is capable of vertical motion. It is connected with a stout plunger $q$, Fig. 2, passing through a stuffing-box H in the lower portion of the apparatus. This plunger is carried by the short arm of a lever J. The latter is operated by a screw-spindle and wheel K, and by these means the plate G can be raised and lowered. By the rising and falling of the plate G the insertion and securing of the bottle-stoppers are effected. To this end angle-pieces $r$, Fig. 5, are so secured upon the rings P that one such angle-piece is inserted between the strap carrying each stopper and the lever $s$ on the bottle. When the bottles placed in the shells on the table D have been filled, the lever J is depressed and plate G raised. (See Fig. 6.) Consequently the angle-pieces $r$ raise the stoppers, and these, retained by their wire straps, are placed on the mouths of the corresponding bottles. The lever J is next raised, plate G now descends, and the angle-pieces $r$ bear on the levers $s$, depress the same, and thereby tighten the stoppers and their packing, so that all the bottles are simultaneously closed without removal from the apparatus. Before the bottles are filled they are also sterilized by circulating steam. To this end a tube L, tinned and fitted with a valve $t$, Figs. 7 and 8, is inserted into each. All the tubes L are attached to the filling-vessel M, so suspended in the upper part $h$ of the filling apparatus as to be vertically movable. They are held in position by guide-cones $u$ on the sheet-metal plate N. Into the upper portion $h$, above the filling-vessel M, steam is also admitted through the branch $v$, cock O, and elbow-pipe $w$, Fig. 2. When the valves $t$ are open, the steam or aqueous vapor passes through the pipes or tubes L to the bottom of the bottles and then escapes through the mouths of the bottles to the interior of the apparatus, so that all the bottles are sterilized in their interior also. The said valves $t$ in the tubes L are opened by lowering the filling-vessel M. Every valve has a prolonged stem $x$ projecting somewhat beyond the end of the tube L. Consequently each valve $t$ is closed when the vessel M is at such a level that the stems $x$ are clear of the bottom of the bottles, Fig. 7. The steam, however, passes freely through the tubes L when filling-vessel M is lowered sufficiently to cause the stems $x$ to bear upon the bottom of the bottles, raising the valves $t$, Fig. 8. When the apparatus B has been thoroughly sterilized by the aqueous vapor circulating within it, the stop-cock O is so set that access of steam through pipe $v$ to the part $h$ is prevented, and connection is made between that portion of the apparatus (through pipe R and siphon S) and pan A, the filling-vessel M being first raised so far that all the valves $t$ of the tubes L close. The steam, acting from above upon the milk in the pan A, causes the same to flow through siphon S, pipe R, cock O, and elbow-pipe $w$, the latter passing (so as to make a tight joint) through the sleeve T on the bottom of the filling-vessel M. The entire quantity of milk passes from pan A to the vessel M. By the window $u$, Fig. 1, it can be ascertained when the milk has passed, and then the vessel M is lowered, whereby the valves in the tubes L are caused to rise and the milk flows uniformly into all the bottles.

When the vessel M is empty and all the bottles are full, (which is ascertained by a window $u'$,) the wheel P is turned, chain $Q'$, passing over wheels Q, wound up, and vessel M raised until it touches the top portion $h$. Pawl V then takes into the notch 2 and the hand-wheel is stopped. All the tubes L are thus raised out of the bottles, being guided by the plate N, which is not raised. The bottles are now in the position shown in Fig. 5. The plate G is then raised and all the stoppers are turned over into the bottle-mouth, and by a downward motion of the plate the projections $r$ on the rings P fasten the stoppering devices. The bottles being thus filled and closed, the connections $h^2$ between the top and bottom portions of the apparatus are released, the pawl V is raised clear of the notch, and the hand-wheel P, being turned, will further raise vessel M, (which, as stated, already bears against the lid $h$,) and the latter is carried upward, its rollers X guiding it on suitable uprights, and the table D becomes readily accessible to the operator, who, having fixed wheel P in position by the pawl V, can easily remove the bottles from the apparatus and set the same aside to be cooled slowly.

The sequence of operations, therefore, is as follows: The apparatus being empty and steam and milk inlets closed, the upper portion $h$ is raised, so that the bottles may be put into place. The bottles are set in the shells or boxes $m$, the operator beginning, preferably, with the inmost row, and the stoppering devices are made to rest on the rings P, as shown in Fig. 5. This done, pawl V is released and the lid $h$ is carefully lowered until it bears upon the portion $g$, and the centering-studs on the flanges pass into the holes for their reception. By further gradual turning of wheel P the receiver or vessel M begins to descend, the tubes L pass into the bottles, and the pawl falls into the first notch on hand-wheel P, so that the wheel stops. The connections between lid and bottom portion are now fastened, pawl V is released, and the vessel M lowered until it rests on the plate N. This causes the rods $x$ to touch the bottom of the bottles, the valves $t$ rise, and tubes L are opened. Cocks $b$ and O are now so adjusted that steam flows from pipe C into the table D and over the filling-vessel M, filling the interior of apparatus B and the bottles, and so heats all the parts, at the same time sterilizing the same. The wheel P is then turned until pawl V engages with the notch 1. This raises the vessel M and by the valves $t$ closes the tubes L. The cock O is then reversed, and the milk meanwhile prepared in the apparatus A, as described, is brought over at a temperature of 100°. The pan A, now empty, is refilled and the milk in the filling-vessel M is allowed to settle. When all agitation in the milk contained in the filling-vessel has ceased, pawl V is set free and vessel M gradually lowered. This causes the valves $t$ to open, so that the milk flows evenly into all the bottles and fills all of them alike. When the bottles are full, hand-wheel P is turned, raising vessel M and tubes L until the engagement of the pawl shows that the tubes L are withdrawn from the bottles. The wheel K is now operated to depress the long arm of the lever J. Consequently the plate G rises and the projections $r$ of the rings F place the stoppers on the bottle-mouths. When the operator has ascertained the completion of this operation by looking through window $u'$, he reverses wheel K, raises the long arm of lever J, and brings down plate G with considerable force. The projections $r$ on rings P will consequently force down the levers $s$ of the stoppering devices, securing all of the latter and closing all the bottles hermetically. This completes the operation, and, the steam-inlets being closed and the lid raised, the bottles are removed for the introduction of a fresh supply.

For large vessels, such as casks and the like, the described form of apparatus is not convenient, and the modification shown in Figs. 9 and 10 has been devised for this purpose. The pan remains unaltered. The filling apparatus B', Figs. 9 and 10, has a hermetically-closing door by which the casks or the like are introduced and placed on the truck $y$. This apparatus is divided into two compartments I II, the upper for receiving the milk before it is allowed to flow into the barrel. Into the lower portion I, fitted with a perforated false bottom Z, a branched steam-pipe $C^2$ is fitted, one branch leading below the perforated bottom Z in order to distribute the steam properly. The upper branch can admit steam into the lid of the apparatus and is fitted with a stop within the compartment and a handle outside of the same. When the cask is in the proper position, which can be ascertained by a sight-hole in the compartment I, the rod $r'$, and by it the tap $h'$, is lowered into the position shown in Fig. 9. The outlet of the tap depresses the back-pressure valve and passes into the cask, but without establishing communication with the compartment II. This only takes place when the handle of rod $r'$ is turned, acting on the plug of tap $h'$. The milk now flows through tap $h'$ and past the back-pressure valve into the cask. When the cask is full, the rod $r'$ is turned back, and this closes the tap $h'$. As soon as the tap is raised again by rod $r'$ the back-pressure valve closes automatically and the milk is hermetically inclosed. The door of the apparatus is now opened and the cask removed.

When milk is to be drawn from the cask, the draw-off cock $d^2$ is opened, the vent $d'$ in the lid having first been opened. The vent $d'$ carries a casing or chamber filled with sterilized wadding or cotton-wool, so that all air passing through it is filtered and likewise sterilized. Any desired quantities may therefore be successively drawn from the cask without affecting the keeping quality of the remainder. To obtain greater security as to the keeping of the milk than the filtration of air, the cask or barrel may be treated with hot steam from the pipe $C^2$ by pushing back the spring back-pressure valve in the bung of the cask, which closes automatically when branch pipe $c^2$ is withdrawn. This makes the interior of the cask sterile.

Suitable U-shaped pipes conduct steam from the compartment I to the compartment II for a like purpose. Pressure-gages, safety-valves, and thermometers serve to indicate and control tension and temperature of the aqueous vapor. When the interior of the apparatus and the cask are thoroughly sterilized, the cock $o$ is opened and the milk is, through pipe E and branch $w$, passed into compartment II. A glazed and graduated sight-hole $u^2$ in the side of the apparatus shows the quantity passed into the compartment II, and this permits of the cock $o$ being closed when just that quantity of milk has flowed into compartment II as will exactly fill the cask introduced into compartment I. This done, the truck $y$ is drawn forward by the rod $x'$ (passing through a stuffing-box in the side of the apparatus) until the upper branch $c$ of the pipe is clear of the cask and the valve opened by such pipe has closed again. This will bring the back-pressure valve in the head of the barrel, Fig. 10, under the tap $h'$, which is vertically adjustable. Rods Z guide this tap. Its outlet is secured in the bottom of the compartment by a stuffing-box, and at its lower end it has outlet-slots. On the plug of this tap a rod $r'$ is provided, which passes through an air-tight stuffing-box $m'$, filled with sterilized wadding. Sterilized air may be preliminarily compressed in the cask by suitable apparatus, which then contains only so much milk as will be expelled through cock $d^3$ by the compressed air it contains after the back-pressure valves are closed.

The apparatus described permits, as will be seen, the filling of suitable vessels of any size with appropriate quantities of sterilized milk and the preservation of the latter indefinitely.

Having now described my invention, what I claim as new, and desire to secure by Letters Patent, is—

1. For filling milk prepared as above specified into bottles or the like, the apparatus having the plate or table D and the movable plate G, carrying rings F, fitted with projections $r$ for supporting and operating the stoppering devices, arranged in conjunction with suitable necessary parts, all as set forth, and shown in the drawings.

2. In a sterilizing apparatus, the combination of a closed receptacle for bottles or vessels, a reservoir, filling-conduits extending from the reservoir to the interior of said receptacle, a stopper or closure operating device, and means extending to the outside of the receptacle for controlling the filling and actuating the closure device, substantially as set forth.

3. The combination of a closed receptacle adapted to receive vessels to be filled, a reservoir for the liquid or material with which the vessels are to be charged, valved ducts connected with said reservoir and adapted to enter the vessels, means for causing said vessels and the reservoir to approach each other, and ducts for supplying steam and material to be preserved to said reservoir, substantially as set forth.

In witness whereof I have hereunto set my hand in presence of two witnesses.

JOHANN FRANZ HUGO GRONWALD.

Witnesses:
E. OEHLMANN,
B. ROI.